United States Patent [19]

Hagiwara et al.

[11] Patent Number: 4,981,923

[45] Date of Patent: Jan. 1, 1991

[54] RESINS FOR TONER OF ELECTROPHOTOGRAPHY AND METHOD FOR MANUFACTURING THE SAME

[75] Inventors: Kazuo Hagiwara; Akira Misawa; Kazuo Hisamatsu; Masaaki Shin, all of Kanagawa, Japan

[73] Assignee: Mitsui Toatsu Chemicals, Inc., Tokyo, Japan

[21] Appl. No.: 359,217

[22] Filed: May 31, 1989

[51] Int. Cl.$^5$ ............................................. C08G 18/08
[52] U.S. Cl. ................................. 525/440; 525/444; 430/109
[58] Field of Search .......................... 430/109; 525/440

[56] References Cited

U.S. PATENT DOCUMENTS 4,833,057  5/1989  Misawa ............................. 430/109

FOREIGN PATENT DOCUMENTS

| | | |
|---|---|---|
| 0102115 | 3/1984 | European Pat. Off. . |
| 0256136 | 2/1988 | European Pat. Off. . |
| 1910393 | 9/1969 | Fed. Rep. of Germany . |
| 63-49768 | 7/1988 | Japan . |
| 63-56659 | 7/1988 | Japan . |
| 8704811 | 8/1987 | PCT Int'l Appl. . |

*Primary Examiner*—Patricia Short
*Attorney, Agent, or Firm*—Oblon, Spivak, McClelland, Maier & Neustadt

[57] ABSTRACT

A resin for toner of electrophotography comprises a urethane-modified polyester resin (D) having a glass transition temperature ranging from 40° to 75° C., which is obtained by reacting a resin mixture composed of a polyester resin (A) having a number-average molecular weight of 1,000 to 15,000 and a hydroxyl value of 10 to 100 and a polyester resin (B) having a number-average molecular weight ranging from 1,000 to 5,000 and a sum of acid value and hydroxyl value of less than 10, in a weight ratio of (A)/(B) ranging from 20:80 to 60:40, with 0.3 to 0.99 molar equivalent of an isocyanate compound (C) per one molar equivalent of hydroxyl group of the polyester resin (A).

The resin for toner is excellent in grindability and storage stability and it provides toners for electrophotography having good anti-blocking properties and good fixing properties whereby good images free of fogging can be obtained.

3 Claims, No Drawings

RESINS FOR TONER OF ELECTROPHOTOGRAPHY AND METHOD FOR MANUFACTURING THE SAME

BACKGROUND OF THE INVENTION

1. Field of the Invention

The present invention relates to a resin for toner of electrophotography, a method for manufacturing the same and a toner composition containing such a resin, and more specifically to a resin for toner which shows high humidity resistance and is stable to humidity.

2. Prior Art

Electrophotography is a technique for obtaining images by forming an electric latent image on a light-sensitive material according to various means utilizing a photoconductive substance, developing such an image with a toner, optionally transferring the toner image to a support for image such as paper and then fixing the image by means of, for instance, a heating roll to thus obtain an electrophotograph. Various kinds of resins have been developed to use them in such toners to be employed in electrophotography. Among these, polyester resins have presently been used widely as resins for toners which are fixed with a heating roll because they show good wettability to transfer paper and can disperse uniformly, therein, additives for toner such as carbon black when they are melted by applying heat and further, they can impart excellent fixing properties to the resulting toner (e.g. U.S. patent application Ser. No. 110695 based on PCT JP87/00064, Jap. Pat. Kokai Koho Nos. 60-263950, 61-86760 and 62-70860).

In the electrophotography, it is always required to provide clear and stable images from the viewpoint of sending information.

However, in the conventional toners, the polyester resins used therein have, at their ends, hydrophilic groups such as carboxyl groups and hydroxyl groups derived from monomers constituting the polymers and, therefore, flow properties and shelf stability as well as charging properties of the toners are greatly influenced by change in environmental conditions, in particular, change in humidity. This makes it impossible to always obtain clear images according to electrophotography technique. As means for solving this problem, there has been proposed, for instance, a method for eliminating influences by such change in properties of the toners which comprises adding, to such a toner composition, additives such as fine powders of hydrophobic silica. This method can improve the properties of the toner in some degree, but is accompanied by a new problem that the surface of a light-sensitive material for copying apparatuses is impaired. Therefore, the foregoing problem has not yet been solved thoroughly.

SUMMARY OF THE INVENTION

An object of the present invention is to provide a resin for toner used in electrophotography which shows good grindability in the preparation of toner, can stand against environmental changes, particularly humidity change and is hence excellent in anti-blocking properties.

Another object of the present invention is to provide a toner composition for electrophotography which has good fixing properties and excellent humidity resistance and which can provide good images free of fogging.

According to the present invention, there is provided a resin for toner of electrophotography which comprises a urethane-modified polyester resin (D) having a glass transition temperature ranging from 40° to 75° C., which is obtained by reacting a resin mixture composed of a polyester resin (A) having a number-average molecular weight of 1,000 to 15,000 and a hydroxyl value of 10 to 100 and a polyester resin (B) having a number-average molecular weight ranging from 1,000 to 5,000 and a sum of acid value and hydroxyl value of less than 10, in a weight ratio of (A)/(B), ranging from 20:80 to 60:40, with 0.3 to 0.99 molar equivalents of an isocyanate compound (C) per one molar equivalent of hydroxyl group of the polyester resin (A).

According to another aspect of the present invention, a toner composition for electrophotography comprising the aforementioned urethane-modified polyester resin (D) and various additives commonly used is provided.

According to a further aspect of the present invention, there is provided a method for preparing the foregoing urethane-modified polyester resin (D) which comprises reacting the foregoing resin mixture composed of the polyester resin (A) and the polyester resin (B) with the isocyanate compound (C) while kneading the reaction mixture using a means for kneading equipped with a built-in screw.

DETAILED DESCRIPTION OF THE INVENTION

The polyester resin (A) herein means those obtained by polycondensation of a polycarboxylic acid and a polyhydric alcohol. Examples of such polycarboxylic acids include such aliphatic dibasic acids an malonic acid, succinic acid, glutaric acid, adipic acid, azelaic acid, sebacic acid and hexahydrophthalic anhydride; such aromatic dibasis acids as phthalic anhydride, phthalic acid, terephthalic acid and isophthalic acid; and lower alkyl esters thereof.

Moreover, examples of such polyhydric alcohols are such diols as ethylene glycol, 1,2-propylene glycol, 1,3-propylene glycol, 1,3-butylene glycol, 1,4-butylene glycol, 1,6-hexanediol, neopentyl glycol, diethylene glycol, dipropylene glycol, hydrogenated bisphenol A and bisphenol A-propylene oxide adducts; and such triols as glycerin, trimethylol propane and trimethylol ethane. Preferred are bisphenol A-propylene oxide adducts among others.

As the method for polycondensation, there may be used, for instance, commonly known high temperature polycondensation and solution polycondensation.

The molecular weight of the polyester resin (A) ranges from 1,000 to 15,000 expressed in number-average molecular weight. This is because if it is less than 1,000, heat resistance of the resultant urethane-modified polyester resin (D) is insufficient, the molecular weight of the urethane-modified resin (D) is lowered when it is melted and kneaded during preparation of toners whereby fog is caused during electrophotography and resistance to offset of the resultant toner is impaired, while if it is more than 15,000, fixing properties of the resulting toner are lowered.

In the invention, the hydroxyl value of the polyester (A) is limited to 10 to 100. This is because if it is less than 10, resistance to offset of the resultant toner is impaired while if it is more than 100, heat resistance of the resulting urethane-modified resin is lowered. The acid value of the polyester (A) is, preferably, less than 2 and more preferably, less than 1.

The polyester resins (B) as used herein are those obtained according in the same manner as described above associated with the polyester resin (A), which have a number-average molecular weight ranging from 1,000 to 5,000 and the sum of acid value and hydroxyl value of less than 10, preferably less than 8. The acid value and hydroxyl value are, preferably, in the range of 0 to 4, respectively. The same examples as those listed above associated with the polyester resin (A) may also be used in this case as polycarboxylic acids and polyhydric alcohols. Particularly preferred polyester resins (B) are condensates of bisphenol A-propylene oxide adducts; and those of trimethylol propane and dimethyl terephthalate.

The molecular weight of the polyester resin (B) ranges from 1,000 to 5,000 and preferably, 2,000 to 4,000 expressed in number-average molecular weight. If it is less than 1,000, resistance to offset of the toner obtained by using the resulting urethane-modified resin (D) is lowered while if it is more than 5,000, fixing properties of the toner and grindability thereof during manufacturing the same is impaired.

Moreover, if the sum of the acid value and the hydroxyl value of the polyester resin (B) is more than 10, flowability and shelf stability as well as charging properties of the resulting toner greatly vary depending upon environmental changes, in particular change in humidity whereby fog is caused during electrophotography and hence it is impossible to always obtain clear images, since the carboxyl groups and hydroxyl groups at the termini of the resin (B) are strongly hydrophilic. On the other hand, if the hydroxyl value increase to more than 10, an ester interchange reaction is easy to occur and, as a result, molecular weight distribution becomes narrow and fixing properties and resistance to offset of toners are impaired.

The weight ratio of the polyester resin (A) to the polyester resin (B) ranges from 20:80 to 60:40. This is because if it is less than 20:80, in other words the amount of the polyester resin (A) is too small, resistance to offset of the resulting toner is lowered and fixing temperature range becomes narrow, while if the weight ratio is more than 60:40, the grindability is imparied.

In addition, as the isocyanate compounds (C) used in the invention there may be mentioned, for instance, hexamethylene diisocyanate, isophorone diisocyanate, tolylene diisocyanate, diphenylmethane diisocyanate, xylylene diisocyanate and tetramethylxylylene diisocyanate.

The isocyanate compound (C) is usually used in an amount ranging from 0.3 to 0.99 molar equivalent, preferably 0.5 to 0.95 molar equivalent per one molar equivalent of hydroxyl group of the polyester resin (A). If the isocyanate compound is used in an amount less than 0.3 molar equivalent, the resistance to offset of the resulting toner is lowered, while if it exceeds 0.99 molar equivalent, the viscosity of reaction solution is greatly increased during the reaction and, in the worst case, the viscosity of the urethane-modified polyester resin (D) becomes too high to stir the reaction solution, in other words there is caused so-called ultra-high viscosity phenomenon which is not practically favorable.

The urethane-modified polyester resin (D) may be obtained, for instance, according to the following method. In other words, it may be obtained by instroducing as isocyanate compound into a mixture of the polyester resins (A) and (B) in one lot, by portionwise addition or continuous addition at a temperature of 60° to 190° C. and reacting these at that temperature for several minutes to several hours.

In a preferred embodiment, the isocyanate compound (C) is reacted with the mixture of the polyester resin (A) and polyester resin (B) while continuously kneading these ingredients in a single screw or twin-screw extruder. In particular, the use of the twin-screw extruder makes it possible to enhance the mixing and dispersion effects of the resin components and the isocyanate compound and to extend the average residence time of the reaction products in a reaction zone of the extruder. As such extruder particularly preferred is a twin-screw engaging type extruder in which these two screws rotate in the same direction.

The precision of a feeder for supplying a mixture of the polyester resins (A) and (B) in a desired ratio to an extruder and that of a dispensing pump are desirably as high as possible. The amount of the resin supplied to the extruder is determined in response to the average residence time thereof in the extruder.

As specifications of the extruder used, it is required to extend the average residence time of the contents of the extruder in order to sufficiently react the polyester resin (A) in the mixture with the isocyanate compound (C). To achieve the purpose, the ratio L/D of the extruder (the ratio of the length (L) of the screw to the diameter (D) thereof) is desirably limited to not less than 10 and preferably not less than 20 and not more than 60. More specifically, the screw of the extruder is divided into three zones from an inlet for supplying the polyester resins (A) and (B), i.e., a feed zone, a volatile components removing zone and a reaction zone, and it is preferred to design the screw so that the length of each zone is 3 to 20 for the feed zone; 0 to 10 for the volatile components removing zone; and 20 to 40 for the reaction zone as expressed in L/D. It is also preferred to design the screw so that the temperature of each zone can independently be established during operating the extruder. In general, the temperature of these zones are desirably controlled precisely to 30° to 100° C. for the feed zone; 100° to 250° C. for the volatile components removing zone; and 120° to 220° C. for the reaction zone.

The volatile components removing zone may be omitted if there are a very little or no volatile components and/or solvents in the starting material and correspondingly the lengths of the feed zone and the reaction zone may be elongated.

A cylinder of the extruder may be heated according to heating with an electric heater or heating with a heat transfer medium. In general, the heating with a heat transfer medium which permits uniform heating is preferred compared with the heating with an electric heater which is liable to cause local heating, but in the present invention the both heating means can be employed.

The rotation number of the screw has a close correlation with the feed rate of the starting resins, but it is preferred to control it so that the average residence time of the contents in the reaction zone is in the range of from 15 to 25 minutes.

The glass transition point of the urethane-modified polyester resin (D) is limited in the present invention to 40° to 75° C. and preferably 50° to 60° C. This is because if the glass transition point thereof is less than 40° C., the anti-block properties of the resulting toner is impaired, while if it exceeds 75° C., the fixing properties of the toner is lowered.

The toner composition for electrophotography comprises the foregoing resin (D) and proper coloring agents and charge controlling agents as well as fillers are incorporated thereinto according to need.

Examples of suitable coloring agents are carbon black, Aniline Blue, Alkoyl Blue, chrome yellow, Ultramarine Blue, Quinoline Yellow, Methylene Blue, Phthalocyanine Blue, Malachite Green, Rose bengale and Magnetite.

As the charge controlling agents, any conventionally known ones may be incorporated into the toner composition of the invention. Examples thereof include Nigrosine, triphenylmethane type dyes and chromium complex of 3,5-di-tert-butyl salicylic acid.

As the fillers, there may be used any conventionally known ones, for instance, colloidal silica, zinc stearate, low molecular weight polypropylene, stearic acid amide and methylenebisstearoamide.

The foregoing resin and other additives are subjected to premixing with a Henschel mixer or the like, then are melted and kneaded at 100° to 180° C. with a kneader, followed by pulverizing the resulting mass and classifying to obtain particles having a size of 5 to 15 microns which may be used as a toner for electrophotography.

The present invention will hereunder be explained in more detail with reference to the following Examples and Preparation Examples. In the following Examples and Preparation Examples, the term "part(s)" denotes "part by weight" unless otherwise specified.

PREPARATION EXAMPLES A-I TO A-V

In these Preparation Examples, polyester resins (A) are to be prepared.

To a 5 liter four-necked flask equipped with a reflux condenser, a water separator, a conduit for introducing nitrogen gas, a thermometer and a stirrer there were charged a polybasic acis and a polyhydric alcohol as listed in Table 1 and they were subjected to dehydration polycondensation at 220° to 240° C. while introducing nitrogen gas into the flask. The reaction was stopped at an acid value of not more than 1 to obtain polyester resins A-I to A-V.

PREPARATION EXAMPLES B-I TO B-VII

In these Preparation Examples, polyester resins (B) are prepared.

To a 5 liter four-necked flask equipped with a reflux condenser, a water or alcohol separator, a conduit for introducing nitrogen gas, a thermometer and a stirrer there were charged a polybasic acids or a lower alkyl ester thereof and a polyhydric alcohol as listed in Table 2 and they were subjected to dehydration or dealcohol polycondensation at 220° to 240° C. while introducing nitrogen gas into the flask. The reaction was stopped at a time where a desired acid value or hydroxyl value was attained to obtain polyester resins B-I to B-VII.

PREPARATION EXAMPLES 1 TO 15

In these Preparation Examples, urethane-modified polyester resins (D) were prepared.

The polyester resins (A) and (B) obtained above were separately pulverized to control the particle size of the resins to 0.5 to 1 mm and were dispensed so as to meet the mixing ratio shown in Table 3 and these resin particles were premixed in a Henschel mixer. The premixed resins were modified with urethane in a twin-screw extruder (available from THE JAPAN STEEL WORKS, LTD. under the trade name of TEX-30; L/D=30). As extrusion conditions, the temperature of a cylinder of the extruder was set up so that the temperature of the resins was established to 170° C.

The length (L/D) and temperature of each of the feed zone, volatile components removing zone and reaction zone are set up as follows:

|  | L/D (30) | Temperature, °C. |
|---|---|---|
| Feed zone | 6 | 160 |
| Volatile components removing zone | 2 | 170 |
| Reaction zone | 22 | 170 |

The modification of the resins with urethane was carried out by continuously supplying the premixed resins to an extruder in the rate of 4 kg/hr with a constant rate feeder to melt and knead the resins, reducing the pressure in the extruder to remove volatile components possibly present in the resins through a venting hole formed on the extruder and then continuously supplying a desired amount of a isocyanate compound (C) (tolylene diisocyanate) as listed in Table 3 to the extruder through an injection nozzle with a constant rate feeder to thus react the resin with the isocyanate compound (C) while controlling the average residence time of the reaction product in an area of the extruder behind the injection nozzle to 20 minutes. The resulting urethane-modified polyester resin (D) was cooled and granulated.

EXAMPLE 1 TO 15

After dispersing and mixing, in a Henschel mixer, 6 parts by weight of carbon black MA-100 (available from MITSUBISHI CHEMICAL INDUSTRIES, LTD.), 2 parts by weight of a charge controlling agent (available from HODOGAYA CHEMICAL CO., LTD. under the trade name of Spiron Black TRH), 2 parts by weight of polypropylene type wax (available from SANYO CHEMICAL INDUSTRIES, LTD. under the trade name of Biscol 550P) and 3 parts by weight of bisamide type wax (available from LYON ARMOUR CO., LTD. under the trade name of Armowax EBS) per 100 parts by weight of the urethane-modified polyester resins obtained in Preparation Examples 1 to 15, the mixtures were melted and kneaded at 160° C. in a twin-screw kneader PCM 30 (available from IKEGAKI TEKKO LTD.) to obtain massive toner compositions.

These compositions were granulated with a hammer mill, followed by finely pulverizing them with a jet pulverizer (IDS 2 Type, available from NIPPON NEWMATIC CO., LTD.) and then classifying by airbone classification to obtain toner particles having an average particle size of 10 microns (3% by weight ≦5 microns; 2% by weight ≧20 microns). Properties of the resulting toner particles are summarized in the following Table IV.

4 Parts by weight of the toner was mixed with 100 parts by weight of ferrite carrier F-150 (NIPPON IRON POWDER CO., LTD.) to obtain a two-component developer.

Using a commercially available magnetic brush type copying apparatus (available from TOSHIBA ELECTRIC EQUIPMENT CORPORATION under the trade name of REODRY 8411), a copying test was performed at room temperature (25° C.), in an environment of 50% and 80% RH (relative humidity) while changing the heat roller temperature. The results of evaluation of fixing temperature range and resistance to migration of vinyl chloride plasticizers are summarized in Table IV.

Also shown in Table IV are the evaluation results on density change of images, the extent of fog generated and the like observed after 50,000 copies were obtained.

In the following Tables, each note is as follows:

(1) Bisphenol A-(2,2)-propylene oxide adduct (available from MITSUI TOATSU CHEMICALS, INC.).

(2) Determined according to JIS K5400.

(3) This means number-average molecular weight determined by gel permeation chromatography (GPC) in which tetrahydrofuran is used as an eluent and a refractometer is used as a detector using monodisperse standard polystyrene as the standard.

(4) Weight-average molecular weight determined according to the same manner as in Item 3).

(5) Determined according to pyridine-acetic anhydride technique.

(6) Glass transition point determined by Differential Scanning Calorimeter (DSC).

(7) Tolylene diisocyanate.

(8) The toner prepared was allowed to stand in an environment of 50° C. and 50% RH or 80% RH for 24 hours and the extent of aggregation was visually observed and evaluated according to the following four-stage evaluation.

⊙ : Aggregation was not observed at all.

○ : Particles were slightly aggregated, but the aggregates were peptized by lightly shaking a container.

Δ: Some of the aggregates were not peptized even if the container was sufficiently shaken.

x: The particles were completely conglomerated.

(9) The grindability was evaluated from the yield of particles having a particle size ranging from 5 to 20 microns obtained by finely pulverizing and classifying them, according to the following four-stage estimation.

A: Yield of not less than 90%; excellent.

B: Yield of not less than 80% and less than 90%; good.

C: Yield of not less than 70% and less than 80%; fair.

D: Yield of less than 70%; failure.

(10) This means a minimum surface temperature of a heat fixing roll at which the so-called offset phenomenon is caused, in other words, molten toners are adhered to the heat fixing roll and again fixed on copying paper at that temperature.

(11) This means a minimum surface temperature of the heat fixing roll required for maintaining a toner layer in a residual weight rate of more than 80% even after rubbing, 50 times with a sand eraser, the toner layer on the image of solid black portions having a size of 2 cm×2 cm, under a load of 125 g/cm$^2$ utilizing a GAKUSHINE Type tester for fastness to crocking (available from DAIEI KAGAKU SEIKI MANUFACTURING CO., LTD.).

(12) On a solid black portion of 5 cm×5 cm, there was superposed a commercially available polyvinyl chloride sheet (content of dioctyl phthalate=50% by weight; available from MITSUI TOATSU CHEMICALS, INC.) the assembly was allowed to stand at 50° C. for 24 hours under a load of 20 g/cm$^2$ and thereafter the polyvinyl chloride sheet was peeled off at room temperature. The migration of the toner to the polyvinyl chloride sheet was observed with the naked eyes at this stage and the extent thereof was evaluated according to the following four-stage evaluation:

⊙ : The migration of toner and dyes was not observed at all.

○ : Only dyes were migrated to the polyvinyl chloride sheet.

Δ: A part of the toner was migrated.

x: Most of the toner was migrated.

(13) The degree of blackness of the solid black portions on images obtained after forming 50,000 copies was estimated with the naked eyes.

(14) The extent of contamination of the background white portion (non-image portion), due to the adhesion of toners, observed on the copy obtained after forming 50,000 copies was inspected with the naked eyes and was estimated according to the following four-stage evaluation:

⊙ : No background contamination.

○ : Observed slight background contamination.

Δ: Observed substantial background contamination.

x: Observed severe background contamination.

As seen from the results listed in Table 4, toner compositions obtained according to the present invention are excellent in their grindability during their preparation, further during storage, can stand against any environmental changes, in particular, change in humidity and, therefore, are excellent in anti-blocking properties and hence good fixing properties. Thus, according to the toner composition of this invention, good images free of fogging can be obtained.

TABLE 1

| Polyester Resin (A) No. | A-I | A-II | A-III | A-IV | A-V |
| --- | --- | --- | --- | --- | --- |
| KB300K[1] (wt. part) | 79 | 91 | 107 | 125 | 140 |
| Neopentyl glycol (wt. part) | 14 | 13 | 12 | 11 | 9 |
| Trimethylol propane (wt. part) | 3 | 5 | 7 | 10 | 12 |
| Isophthalic acid (wt. part) | 54 | 67 | 78 | 83 | 91 |
| OH/COOH | 1.22 | 1.20 | 1.18 | 1.17 | 1.15 |
| Hydroxyl value[2] (KOHmg/g) | 130 | 85 | 20 | 11 | 6 |
| Mn[3] | 800 | 1980 | 7700 | 14200 | 18000 |
| Mw[4] | 2400 | 6100 | 23800 | 44000 | 61000 |

TABLE 2

| Polyester Resin (B) No. | B-I | B-II | B-III | B-IV | B-V | B-VI | B-VII |
| --- | --- | --- | --- | --- | --- | --- | --- |
| KB300K (wt. part) | 1000 | 1200 | 610 | 790 | 540 | 740 | 810 |

TABLE 2-continued

| Polyester Resin (B) No. | B-I | B-II | B-III | B-IV | B-V | B-VI | B-VII |
|---|---|---|---|---|---|---|---|
| Trimethylol propane (wt. part) | — | 4.0 | 3.1 | 4.2 | 3.6 | 5.9 | 6.6 |
| Dimethyltelephthalate (wt. part) | 870 | 960 | 423 | 520 | — | — | 550 |
| Isophthalic acid (wt. part) | — | — | — | — | 300 | 440 | — |
| Mn | 820 | 1250 | 3000 | 4930 | 3100 | 3400 | 6100 |
| Mw | 1800 | 2850 | 6600 | 10850 | 6880 | 7900 | 14000 |
| Acid value[5] (KOHmg/g) | <1 | <1 | <1 | <1 | 36 | 11 | <1 |
| Acid value + Hydroxyl value (KOHmg/g) | 9 | 8 | 7 | 5 | 44 | 35 | 4 |
| Tg[6] (°C.) | 40 | 45 | 53 | 56 | 62 | 60 | 58 |

TABLE 3

| Preparation Example No. | | 1 | 2 | 3 | 4 | 5 | 6 | 7 | 8 |
|---|---|---|---|---|---|---|---|---|---|
| Polyester resin (A) | No. | A-I | A-II | A-II | A-III | A-IV | A-II | A-II | A-II |
| | Wt. part | 40 | 40 | 40 | 20 | 60 | 40 | 40 | 70 |
| Polyester resin (B) | No. | B-III | B-I | B-III | B-III | B-III | B-II | B-IV | B-III |
| | wt. part | 60 | 60 | 60 | 80 | 40 | 60 | 60 | 30 |
| Urethane-modified polyester resin (D) | | | | | | | | | |
| TDI[7] | | 12.9 | 8.5 | 8.5 | 1.2 | 1.5 | 8.5 | 8.5 | 14.9 |
| NCO/OH | | 0.8 | 0.8 | 0.8 | 0.9 | 0.7 | 0.8 | 0.8 | 0.8 |
| Kneading temperature (°C.) | | 170 | 170 | 170 | 170 | 170 | 170 | 170 | 170 |
| Residence time (min.) | | 20 | 20 | 20 | 20 | 20 | 20 | 20 | 20 |
| Mn | | 3100 | 900 | 3200 | 3100 | 3400 | 1300 | 5000 | Ultra-high viscosity |
| Mw | | 45000 | 46000 | 125000 | 108000 | 135000 | 98000 | 115000 | |
| Tg (°C.) | | 47 | 47 | 62 | 61 | 64 | 49 | 57 | 73 |

| Preparation Example No. | | 9 | 10 | 11 | 12 | 13 | 14 | 15 |
|---|---|---|---|---|---|---|---|---|
| Polyester resin (A) | No. | A-II | A-II | A-II | A-II | A-II | A-II | A-V |
| | Wt. part | 10 | 40 | 40 | 40 | 40 | 40 | 40 |
| Polyester resin (B) | No. | B-III | B-III | B-III | B-V | B-VI | B-VII | B-III |
| | wt. part | 90 | 60 | 60 | 60 | 60 | 60 | 60 |
| Urethane-modified polyester resin (D) | | | | | | | | |
| TDI[7] | | 2.1 | 2.1 | 10.6 | 8.5 | 8.5 | 8.5 | 8.5 |
| NCO/OH | | 0.8 | 0.2 | 1.0 | 0.8 | 0.8 | 0.8 | 0.3 |
| Kneading temperature (°C.) | | 170 | 170 | 170 | 170 | 170 | 170 | 170 |
| Residence time (min.) | | 20 | 20 | 20 | 20 | 20 | 20 | 20 |
| Mn | | 3000 | 3000 | Ultra-high viscosity | 3800 | 5000 | 6200 | Ultra-high viscosity |
| Mw | | 39000 | 26000 | | 110000 | 75000 | 156000 | |
| Tg (°C.) | | 54 | 52 | 75 | 72 | 67 | 65 | 73 |

TABLE 4

| Example No. | 1 | 2 | 3 | 4 | 5 | 6 | 7 | 8 |
|---|---|---|---|---|---|---|---|---|
| Properties of toner particles | | | | | | | | |
| Anti-blocking[8] (RH 50%) | x | x | ⊙ | ⊙ | ⊙ | ⊙ | ⊙ | ⊙ |
| Anti-blocking (RH 80%) | x | x | ⊙ | ⊙ | ⊙ | ⊙ | ⊙ | ⊙ |
| Grindability[9] | A | A | A | A | A | A | A | D |
| Fixing property | | | | | | | | |
| Offset occurrence | 190 | 190 | 240< | 240< | 240< | 240< | 240< | 240< |

TABLE 4-continued

| | | | | | | | | |
|---|---|---|---|---|---|---|---|---|
| temperature[10] (°C.) | | | | | | | | |
| Lower temp. of fixing (°C.) | 140 | 130 | 140 | 140 | 140 | 120 | 150 | 200 |
| Temp. range of fixing (°C.) | 50 | 60 | 100< | 100< | 100< | 120< | 90< | 40< |
| Resistance to dioctyl phthalate[12] | Δ | x | ⊙ | ⊙ | ⊙ | ⊙ | ⊙ | ⊙ |
| Image | | | | | | | | |
| Image intensity[13] | Intense | Intense | Intense | Intense | Intense | Intense | Intense | Intense |
| Fogging[14] (RH 50%) | x | x | ⊙ | ⊙ | ⊙ | ⊙ | ⊙ | ⊙ |
| Fogging (RH 80%) | x | x | ⊙ | ⊙ | ⊙ | ⊙ | ⊙ | ⊙ |
| Inside or outside the scope of the present invention | Outside | Outside | Inside | Inside | Inside | Inside | Inside | Outside |

| Example No. | 9 | 10 | 11 | 12 | 13 | 14 | 15 |
|---|---|---|---|---|---|---|---|
| Properties of toner particles | | | | | | | |
| Anti-blocking[8] (RH 50%) | x | x | ⊙ | Δ | Δ | ⊙ | ⊙ |
| Anti-blocking (RH 80%) | x | x | ⊙ | x | x | ⊙ | ⊙ |
| Grindability[9] | A | A | D | A | A | D | D |
| Fixing property | | | | | | | |
| Offset occurrence temperature[10] (°C.) | 190 | 180 | 240< | 240 | 230 | 240< | 240< |
| Lower temp. of fixing (°C.) | 140 | 140 | 200 | 160 | 180 | 190 | 200 |
| Temp. range of fixing (°C.) | 50 | 40 | 40< | 80 | 50 | 50< | 40< |
| Resistance to dioctyl phthalate[12] | x | x | ⊙ | ⊙ | ○ | ⊙ | ⊙ |
| Image | | | | | | | |
| Image intensity[13] | Intense | Intense | Intense | Intense | Intense | Intense | Intense |
| Fogging[14] (RH 50%) | x | x | ⊙ | ⊙ | ○ | ⊙ | ⊙ |
| Fogging (RH 80%) | x | x | ⊙ | ○ | Δ | ⊙ | ⊙ |
| Inside or outside the scope of the present invention | Outside | Outside | Outside | Outside | Outside | Outside | Outside |

What is claimed is:

1. A method for preparing a urethane-modified polyester resin (D) having a glass transition temperature of 40° to 75° C. which comprises reacting a resin mixture composed of a polyester resin (A) having a number-average molecular weight of 1,000 to 15,000 and a hydroxyl value of 10 to 100 and a polyester resin (B) having a number-average molecular weight of 1,000 to 5,000 and a sum of acid value and hydroxyl value of less than 10 in a weight ratio of (A)/(B) of 20:80 to 60:40 with an isocyanate compound (C) in an amount ranging from 0.3 to 0.99 molar equivalent per molar equivalent of the hydroxyl group of the polyester resin (A) while continuously kneading the reaction mixture using a means for kneading which is equipped with a built-in screw and whose ratio of length L of the screw to diameter D thereof, L/D, is not less than 10.

2. The method of claim 1 wherein the means for kneading is a single screw extruder or a twin-screw extruder.

3. The method of claim 1 wherein the ratio L/D of the extruder is not less than 20 and not more than 60.

* * * * *